Oct. 31, 1961  R. E. GEIGER  3,006,582
STABILIZING DEVICE
Filed Aug. 10, 1956
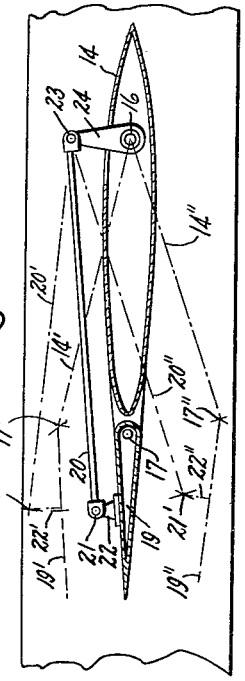
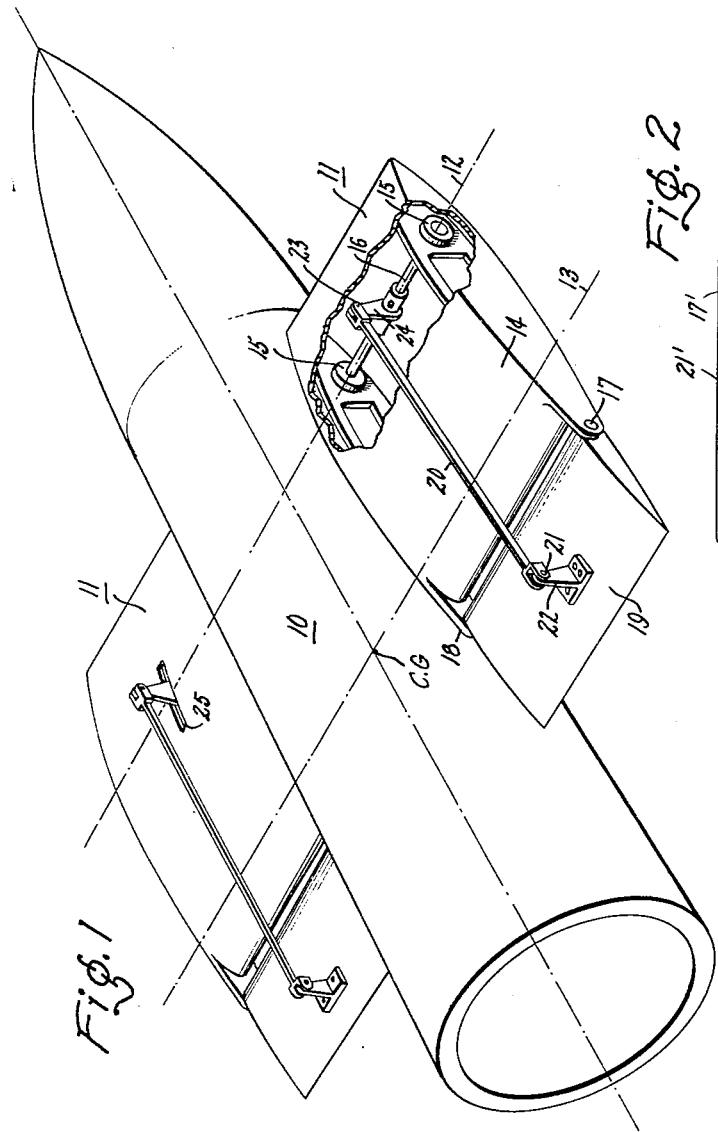
Inventor
Richard E. Geiger
by Alfred B. Levine
His Attorney

United States Patent Office 3,006,582
Patented Oct. 31, 1961

3,006,582
STABILIZING DEVICE
Richard E. Geiger, Schenectady, N.Y., assignor to General Electric Company, a corporation of New York
Filed Aug. 10, 1956, Ser. No. 603,284
2 Claims. (Cl. 244—82)

This invention generally relates to attitude stabilizing devices for bodies moving in a fluid medium, and more particularly to such devices that are self-responsive to fluid disturbances for minimizing the effect of the disturbances.

As a craft travels through a fluid medium, such as air or water, it is transiently being subjected to fluid disturbances such as whirls, air pockets or the like, all of which exert forces on the craft tending to deflect its attitude from that desired. To counteract such disturbances, fixed fins, rudders or the like projecting from the rear of the craft have been most generally used, much in the manner of tail feathers on an arrow or dart. However, such outwardly projecting fins make the craft ungainly and awkward to store and launch, presenting considerable difficulty, for example, if the craft is to be launched from a tube or other confined location. In other applications, instrument operated motor driven rudders or the like have been used for directional control or "damping" of the craft. However, such instrument controlled devices suffer from the disadvantage of being complex, expensive, heavy, and requiring a considerable portion of otherwise available and valuable space within the craft.

In accordance with the present invention, there is provided a self-stabilizing device, comprising a unique rotatable craft appendage structure, that responds to such transient fluid disturbances in such a manner as to transmit a counteracting force and torque upon a craft to minimize the disturbance. In contrast to the fixed fin stabilizing arrangements, this structure need not extensively project from the rear of the craft but may be incorporated in a more streamlined manner elsewhere on the craft. In addition, the present invention may be operated by instruments to provide directional control of the craft in addition to performing its stabilizing and attitude control functions.

It is accordingly, one object of the present invention to provide a lightweight, inexpensive, and reliable attitude stabilizing device for a craft movable through a fluid medium.

Still another object to the present invention is to provide such an attitude stabilizing device that both responds to and is actuated by the fluid medium.

Other objects and many attendant advantages will be more readily comprehended to those skilled in the art upon a detailed consideration of the following specifications taken with the accompanying drawing wherein:

FIG. 1 is a perspective view, partially cut away, schematically depicting one preferred embodiment of the present invention, and FIG. 2 is a side sectional view depicting the operation of the device of FIG. 1.

Referring now to FIG. 1, there is generally shown a craft 10, such as a missile adapted to travel through a fluid medium, having a pair of appendages 11 pivotally connnected for rotation about an axis 12 located forward of the craft's center of gravity axis 13.

Appendages 11 are each preferably comprised of a main airfoil surface 14 hingedly supported by suitable bearings 15, to rotate about a shaft 16 rigidly affixed to the craft and coincident with longitudinal axis 12. Rotatably supported at the trailing edge of airfoil surface 14 at positions 17 and 18 is a second airfoil surface or tab 19 which is adapted to rotate with respect to airfoil 14 in a matter to be hereafter described.

To control the displacement of tab 19 relative to the main airfoil 14, there is preferably provided a suitable linkage such as bar 20, interconnecting tab 19 with shaft 16. One end of bar or link 20 is pivotally connected at 21 to an upstanding support 22 affixed to tab 19, and the opposite end of the bar 20 is pivotally connected at 23 to an upstanding support 24 affixed to shaft 16 and positioned inside main airfoil 14 to project through a slotted opening 25 as shown. Since tab 19 is pivotally connected to main airfoil 14 at 17 and 18 and additionally pivotally connected at 21 and 23 to stationary shaft 16, it is evident that rotation of main airfoil 14 about shaft 16 in one direction results in deflection, or rotation, of tab 19 in the opposite direction.

More specifically as may be observed from FIG. 2, as airfoil 14 is rotated clockwise about axis 16 to assume the position shown in dotted lines as 14', linkage 20 rotates clockwise about pivot 23 to position 20' and compels tab 19 to rotate counterclockwise with respect to airfoil 14 to a position 19'. Conversely, as main airfoil 14 rotates counterclockwise (downwardly) to a position 14", linkage 20 rotates counterclockwise to a new position 20" and compels tab 19 to rotate clockwise about airfoil 14 to assume the position shown in dotted lines as 19". Thus, it is evident that as airfoil 14 is deflected about shaft 16, tab 19 is deflected in the opposite direction. Additionally, it is observed that the relative deflection of tab 19 from airfoil 14 is a function of the rotational deflection of airfoil 14 about shaft 16. In other words, rotation of airfoil 14 about shaft 16 in a given direction and for given number of degrees results in movement of tab 19 about its pivots 17 and 18 in the opposite direction and through an angle which is a function of the rotational deflection of main airfoil 14.

In accordance with the present invention main airfoil 14 is preferably "free floating." That is, it may be freely rotated about shaft 16 in response to aerodynamic or hydrodynamic forces existing outside of the craft. Thus, for example, as a wind gust or other fluid disturbance is encountered, airfoil 14 is rotatably driven by the gust in a direction to orient itself with the direction of the resultant air flow and, therefore, its center of lift, or center of thrust, is located to the rear of axis 12, or between axis 12 and the pivot axis of tab 19. However, such rotation of airfoil 14 in one direction results in rotating tab 19 in the opposite direction. The effect of such a rotation of tab 19 is to produce a torque due to the air flow around tab 19 which causes airfoil 14 to rotate an additional amount in the same direction, as can be seen from a perusal of FIG. 2. Thus airfoil 14 is compelled to seek an equilibrium position about shaft 16 at which the rotational force or moment due to air flow around airfoil 14 is balanced by an equal and opposite moment due to air flow around tab 19. When the equilibrium occurs, the overall "freely floating" appendage is rotationally balanced about shaft 16, and this appendage assumes a stationary position with respect to the craft. In other words, equilibrium is obtained when the total turning moment operating to rotate the airfoil 14 in one direction is balanced by an opposite turning moment on tab 19, with the result that no further rotation about shaft 16 occurs. However, since the forces acting upon airfoil 14 and tab 19 are in different directions and of different magnitudes, a net translational force operates upon shaft 16 that is equal to the vector sum of the forces operating upon airfoil 14 and tab 19. This resulting translational force, acting upon shaft 16, produces a turning moment upon the craft, since shaft 16 is displaced from the center of gravity axis 13. Consequently, by suitably selecting the relative surface areas of main airfoil 14 and tab 19, and the length and positioning of the linkage including the bar 20 and pivotal connectors, a moment is applied to the craft in such a direction and of such magnitude as to counteract the effect of the fluid gust upon a craft or, in other words, stabilize the craft against such fluid disturbance.

As is now believed evident to those skilled in the art, the present invention provides a self-stabilizing mechanism for navigable craft that both responds to fluid forces tending to disturb craft attitude and adjust itself in such a manner as to exert turning moments upon a craft tending to counteract the effect of such fluid disturbances. This is basically performed by providing a "freely floating" appendage mechanism including two relatively movable surfaces that are so interconnected that a given deflection of one appendage in response to such a force results in a given reversed deflection of the second. The net result of these oppositely moving surfaces is that the overall appendage is utimately rotated toward a balanced or equilibrium condition depending upon the direction of the fluid force and that in such a position it exerts a net translational force upon the craft at a point displaced from the craft's center of gravity, thereby to provide a turning moment about this center of gravity axis and stabilize the craft against the effect of the fluid disturbance.

Although but one pair of such appendages are disclosed, it is evident that this pair provides stabilization of the craft about only one of the craft stability axes, and that a plurality of such appendages may be employed to completely stabilize a craft about any one or all of its stability axes. It is further believed evident to those skilled in the art that depending upon the aerodynamic or hydrodynamic instability of the craft and the degree of stabilization necessary, many changes may be made in the shape, size, placement and length of the airfoil, tab, and linkage mechanism, as desired, without departing from the spirit and scope of this invention. For example, although FIG. 1 depicts an airfoil surface 14 and tab 19 having relatively large surface areas for purposes of clearly illustrating the arrangement and operation of the parts, considerably smaller and narrower surfaces may preferably be employed and positioned proximate the converging nose portion of the craft (further from the center of gravity axis 13 to provide larger moments) to lessen the extent of the outward projection and thereby facilitate the launching of such a craft from a suitable tube or guide rail, as desired. Accordingly, this invention is to be considered as being limited only by the following claims appended hereto:

What is claimed is:

1. In combination a vehicle adapted to move through a fluid medium, said vehicle having a center of gravity and a longitudinal axis, said vehicle adapted to normally move through the medium in a direction substantially parallel to its longitudinal axis, a shaft mounted on said vehicle, said shaft being mounted forward of the center of gravity of the vehicle and so that the shaft is substantially normal to the longitudinal axis of said vehicle, an airfoil mounted on said shaft for free rotation about said shaft, a trim tab pivotally mounted on the rear of said airfoil, support means fixedly mounted on the shaft, support means fixedly mounted on the tab, a bar pivotally connected to the support means affixed to the shaft and pivotally connected to the support means connected to the trim tab, the center of lift of said airfoil being located between the shaft and the trim tab.

2. A stabilizer for a device movable through a fluid comprising a shaft having a longitudinal axis, said shaft adapted to be mounted on the device ahead of the device's center of gravity, a member pivotally mounted on said shaft, a trim tab pivotally mounted at the rear of said member, the center of lift of said member being located between the shaft and the trim tab, support means fixedly mounted on the shaft, a link, one end of said link being pivotally connected to the support means to pivot about a pivot axis located a fixed distance from the longitudinal axis of said shaft and in a fixed direction with respect to the longitudinal axis of said shaft, the other end of said link being pivotally connected to the trim tab.

References Cited in the file of this patent

UNITED STATES PATENTS

| 1,661,115 | Flettner | Feb. 28, 1928 |
| 1,827,304 | Thurston | Oct. 13, 1931 |
| 2,252,284 | Child | Aug. 12, 1941 |
| 2,357,465 | Focht | Sept. 5, 1944 |
| 2,369,832 | Klose | Feb. 20, 1945 |
| 2,406,588 | Cornelius | Aug. 27, 1946 |
| 2,430,793 | Wells | Nov. 11, 1947 |

FOREIGN PATENTS

| 1,078,576 | France | May 12, 1954 |